(12) United States Patent
Larsson et al.

(10) Patent No.: US 7,019,429 B1
(45) Date of Patent: Mar. 28, 2006

(54) METHOD OF APPLYING A TUBE MEMBER IN A STATOR SLOT IN A ROTATING ELECTRICAL MACHINE

(75) Inventors: Bertil Larsson, Vasteras (SE); Bengt Rothman, Vasteras (SE)

(73) Assignee: Asea Brown Boveri AB, Vasteras (SE)

( * ) Notice: Subject to any disclaimer, the term of this patent is extended or adjusted under 35 U.S.C. 154(b) by 0 days.

(21) Appl. No.: 09/554,884

(22) PCT Filed: Nov. 27, 1998

(86) PCT No.: PCT/SE98/02162

§ 371 (c)(1),
(2), (4) Date: Aug. 22, 2000

(87) PCT Pub. No.: WO99/31781

PCT Pub. Date: Jun. 24, 1999

(30) Foreign Application Priority Data

Nov. 27, 1997 (SE) ............................................. 9704380

(51) Int. Cl.
*H02K 3/24* (2006.01)

(52) U.S. Cl. ........................... 310/215; 310/42; 310/54; 310/196; 174/DIG. 32

(58) Field of Classification Search ................... 310/42, 310/54, 196, 215; 174/DIG. 13–33; 29/596, 29/598
See application file for complete search history.

(56) References Cited

U.S. PATENT DOCUMENTS

| 681,800 | A | 9/1901 | Lasche |
|---|---|---|---|
| 847,008 | A | 3/1907 | Kitsee |
| 1,304,451 | A | 5/1919 | Burnham |
| 1,418,856 | A | 6/1922 | Williamson |
| 1,481,585 | A | 1/1924 | Beard |
| 1,508,456 | A | 9/1924 | Lenz |
| 1,728,915 | A | 9/1929 | Blankenship et al. |
| 1,742,985 | A | 1/1930 | Burnham |
| 1,747,507 | A | 2/1930 | George |
| 1,756,672 | A | 4/1930 | Barr |
| 1,762,775 | A | 6/1930 | Ganz |
| 1,781,308 | A | 11/1930 | Vos |
| 1,861,182 | A | 5/1932 | Hendey et al. |
| 1,904,885 | A | 4/1933 | Seeley |

(Continued)

FOREIGN PATENT DOCUMENTS

| AT | 399790 | 7/1995 |
|---|---|---|
| BE | 565063 | 2/1957 |
| CH | 391071 | 4/1965 |
| CH | 266037 | 10/1965 |

(Continued)

OTHER PUBLICATIONS

U.S. Appl. No. 09/541,523, pending.
Shipboard Electrical Insulation; G. L. Moses, 1951, pp2&3.
ABB Elkrafthandbok; ABB AB; 1988 ; pp274–276.
Elkraft teknisk Handbok, 2 Elmaskiner; A. Alfredsson et al; 1988, pp 121–123.

(Continued)

*Primary Examiner*—Burton Mullins
(74) *Attorney, Agent, or Firm*—Oblon, Spivak, McClelland, Maier & Neustadt, P.C.

(57) ABSTRACT

A method for mounting a tube in a space having a shape corresponding to the shape of the tube. The tube is inserted into the space, pressurized with a hot pressure medium causing the tube to expand until the space is filled, then a cold pressure medium is substituted for the hot pressure medium while maintaining constant pressure causing the tube to solidify in its expanded shape. Also, a rotating electric machine having such a tube between windings of a high-voltage cable in a stator slot.

20 Claims, 2 Drawing Sheets

U.S. PATENT DOCUMENTS

| | | |
|---|---|---|
| 1,974,406 A | 9/1934 | Apple et al. |
| 2,006,170 A | 6/1935 | Juhlin |
| 2,206,856 A | 7/1940 | Shearer |
| 2,217,430 A | 10/1940 | Baudry |
| 2,241,832 A | 5/1941 | Wahlquist |
| 2,251,291 A | 8/1941 | Reichelt |
| 2,256,897 A | 9/1941 | Davidson et al. |
| 2,295,415 A | 9/1942 | Monroe |
| 2,409,893 A | 10/1946 | Pendleton et al. |
| 2,415,652 A | 2/1947 | Norton |
| 2,424,443 A | 7/1947 | Evans |
| 2,436,306 A | 2/1948 | Johnson |
| 2,446,999 A | 8/1948 | Camilli |
| 2,459,322 A | 1/1949 | Johnston |
| 2,462,651 A | 2/1949 | Lord |
| 2,498,238 A | 2/1950 | Berberich et al. |
| 2,650,350 A | 8/1953 | Heath |
| 2,721,905 A | 10/1955 | Monroe |
| 2,749,456 A | 6/1956 | Luenberger |
| 2,780,771 A | 2/1957 | Lee |
| 2,846,599 A | 8/1958 | McAdam |
| 2,885,581 A | 5/1959 | Pileggi |
| 2,943,242 A | 6/1960 | Schaschi et al. |
| 2,947,957 A | 8/1960 | Spindler |
| 2,959,699 A | 11/1960 | Smith et al. |
| 2,962,679 A | 11/1960 | Stratton |
| 2,975,309 A | 3/1961 | Seidner |
| 3,014,139 A * | 12/1961 | Shildneck ............ 310/64 |
| 3,098,893 A | 7/1963 | Pringle et al. |
| 3,130,335 A | 4/1964 | Rejda |
| 3,143,269 A | 8/1964 | Van Eldik |
| 3,157,806 A | 11/1964 | Wiedemann |
| 3,158,770 A | 11/1964 | Coggeshall et al. |
| 3,197,723 A | 7/1965 | Dortort |
| 3,268,766 A | 8/1966 | Amos |
| 3,304,599 A | 2/1967 | Nordin |
| 3,354,331 A | 11/1967 | Broeker et al. |
| 3,365,657 A | 1/1968 | Webb |
| 3,372,283 A | 3/1968 | Jaecklin |
| 3,392,779 A | 7/1968 | Tilbrook |
| 3,411,027 A | 11/1968 | Rosenberg |
| 3,418,530 A | 12/1968 | Cheever |
| 3,435,262 A | 3/1969 | Bennett et al. |
| 3,437,858 A | 4/1969 | White |
| 3,444,407 A | 5/1969 | Yates |
| 3,447,002 A | 5/1969 | Ronnevig |
| 3,484,690 A | 12/1969 | Wald |
| 3,541,221 A | 11/1970 | Aupoix et al. |
| 3,560,777 A | 2/1971 | Moeller |
| 3,571,690 A | 3/1971 | Lataisa |
| 3,593,123 A | 7/1971 | Williamson |
| 3,631,519 A | 12/1971 | Salahshourian |
| 3,644,662 A | 2/1972 | Salahshourian |
| 3,651,244 A | 3/1972 | Silver et al. |
| 3,651,402 A | 3/1972 | Leffmann |
| 3,660,721 A | 5/1972 | Baird |
| 3,666,876 A | 5/1972 | Forster |
| 3,670,192 A | 6/1972 | Andersson et al. |
| 3,675,056 A | 7/1972 | Lenz |
| 3,684,821 A | 8/1972 | Miyauchi et al. |
| 3,684,906 A | 8/1972 | Lexz |
| 3,699,238 A | 10/1972 | Hansen et al. |
| 3,716,652 A | 2/1973 | Lusk et al. |
| 3,716,719 A | 2/1973 | Angelery et al. |
| 3,727,085 A | 4/1973 | Goetz et al. |
| 3,740,600 A | 6/1973 | Turley |
| 3,743,867 A | 7/1973 | Smith, Jr. |
| 3,746,954 A | 7/1973 | Myles et al. |
| 3,758,699 A | 9/1973 | Lusk et al. |
| 3,778,891 A | 12/1973 | Amasino et al. |
| 3,781,739 A | 12/1973 | Meyer |
| 3,787,607 A | 1/1974 | Schlafly |
| 3,792,399 A | 2/1974 | McLyman |
| 3,801,843 A | 4/1974 | Corman et al. |
| 3,809,933 A | 5/1974 | Sugawara et al. |
| 3,813,764 A | 6/1974 | Tanaka et al. |
| 3,820,048 A | 6/1974 | Ohta et al. ............ 336/70 |
| 3,828,115 A | 8/1974 | Hvizd, Jr. |
| 3,881,647 A | 5/1975 | Wolfe |
| 3,884,154 A | 5/1975 | Marten |
| 3,891,880 A | 6/1975 | Britsch |
| 3,902,000 A | 8/1975 | Forsyth et al. |
| 3,912,957 A | 10/1975 | Reynolds |
| 3,932,779 A | 1/1976 | Madsen |
| 3,932,791 A | 1/1976 | Oswald |
| 3,943,392 A | 3/1976 | Keuper et al. |
| 3,947,278 A | 3/1976 | Youtsey |
| 3,965,408 A | 6/1976 | Higuchi et al. |
| 3,968,388 A | 7/1976 | Lambrecht et al. |
| 3,971,543 A | 7/1976 | Shanahan |
| 3,974,314 A | 8/1976 | Fuchs |
| 3,993,860 A | 11/1976 | Snow et al. |
| 3,995,785 A | 12/1976 | Arick et al. |
| 4,001,616 A | 1/1977 | Lonseth et al. |
| 4,008,367 A | 2/1977 | Sunderhauf |
| 4,008,409 A | 2/1977 | Rhudy et al. |
| 4,031,310 A | 6/1977 | Jachimowicz |
| 4,039,740 A | 8/1977 | Iwata |
| 4,041,431 A | 8/1977 | Enoksen |
| 4,047,138 A | 9/1977 | Steigerwald |
| 4,064,419 A | 12/1977 | Peterson |
| 4,084,307 A | 4/1978 | Schultz et al. |
| 4,085,347 A | 4/1978 | Lichius |
| 4,088,953 A | 5/1978 | Sarian |
| 4,091,138 A | 5/1978 | Takagi et al. |
| 4,091,139 A | 5/1978 | Quirk |
| 4,099,227 A | 7/1978 | Liptak |
| 4,103,075 A | 7/1978 | Adam |
| 4,106,069 A | 8/1978 | Trautner et al. |
| 4,107,092 A | 8/1978 | Carnahan et al. |
| 4,109,098 A | 8/1978 | Olsson et al. |
| 4,121,148 A | 10/1978 | Platzer |
| 4,132,914 A | 1/1979 | Khutoretsky |
| 4,134,036 A | 1/1979 | Curtiss |
| 4,134,055 A | 1/1979 | Akamatsu |
| 4,134,146 A | 1/1979 | Stetson |
| 4,149,101 A | 4/1979 | Lesokhin et al. |
| 4,152,615 A | 5/1979 | Calfo et al. |
| 4,160,193 A | 7/1979 | Richmond |
| 4,164,672 A | 8/1979 | Flick |
| 4,164,772 A | 8/1979 | Hingorani |
| 4,177,397 A | 12/1979 | Lill |
| 4,177,418 A | 12/1979 | Brueckner et al. |
| 4,184,186 A | 1/1980 | Barkan |
| 4,200,817 A | 4/1980 | Bratoljic |
| 4,200,818 A | 4/1980 | Ruffing et al. |
| 4,206,434 A | 6/1980 | Hase |
| 4,207,427 A | 6/1980 | Beretta et al. |
| 4,207,482 A | 6/1980 | Neumeyer et al. |
| 4,208,597 A | 6/1980 | Mulach et al. |
| 4,229,721 A | 10/1980 | Koloczek et al. |
| 4,238,339 A | 12/1980 | Khutoretsky et al. |
| 4,239,999 A | 12/1980 | Vinokurov et al. |
| 4,245,182 A | 1/1981 | Aotsu et al. |
| 4,246,694 A | 1/1981 | Raschbichler et al. |
| 4,255,684 A | 3/1981 | Mischler et al. |
| 4,258,280 A | 3/1981 | Starcevic |
| 4,262,209 A | 4/1981 | Berner |
| 4,274,027 A | 6/1981 | Higuchi et al. |
| 4,281,264 A | 7/1981 | Keim et al. |
| 4,292,558 A | 9/1981 | Flick et al. |

| Patent No. | Date | Inventor |
|---|---|---|
| 4,307,311 A | 12/1981 | Grozinger |
| 4,308,476 A | 12/1981 | Schuler |
| 4,308,575 A | 12/1981 | Mase |
| 4,310,966 A | 1/1982 | Brietenbach |
| 4,314,168 A | 2/1982 | Breitenbach |
| 4,317,001 A | 2/1982 | Silver et al. |
| 4,320,645 A | 3/1982 | Stanley |
| 4,321,426 A | 3/1982 | Schaeffer |
| 4,321,518 A | 3/1982 | Akamatsu |
| 4,326,181 A | 4/1982 | Allen ................. 336/12 |
| 4,330,726 A | 5/1982 | Albright et al. |
| 4,337,922 A | 7/1982 | Streiff et al. |
| 4,341,989 A | 7/1982 | Sandberg et al. |
| 4,347,449 A | 8/1982 | Beau |
| 4,347,454 A | 8/1982 | Gellert et al. |
| 4,353,612 A | 10/1982 | Meyers |
| 4,357,542 A | 11/1982 | Kirschbaum |
| 4,360,748 A | 11/1982 | Raschbichler et al. |
| 4,361,723 A | 11/1982 | Hvizd, Jr. et al. |
| 4,365,178 A | 12/1982 | Lexz |
| 4,367,425 A | 1/1983 | Mendelsohn et al. |
| 4,367,890 A | 1/1983 | Spirk |
| 4,368,418 A | 1/1983 | Demello et al. |
| 4,369,389 A | 1/1983 | Lambrecht |
| 4,371,745 A | 2/1983 | Sakashita |
| 4,384,944 A | 5/1983 | Silver et al. |
| 4,387,316 A | 6/1983 | Katsekas |
| 4,401,920 A | 8/1983 | Taylor et al. |
| 4,403,163 A | 9/1983 | Rarmerding et al. |
| 4,404,486 A | 9/1983 | Keim et al. |
| 4,411,710 A | 10/1983 | Mochizuki et al. |
| 4,421,284 A | 12/1983 | Pan |
| 4,425,521 A | 1/1984 | Rosenberry, Jr. et al. |
| 4,426,771 A | 1/1984 | Wang et al. |
| 4,429,244 A | 1/1984 | Nikiten et al. |
| 4,431,960 A | 2/1984 | Zucker |
| 4,432,029 A | 2/1984 | Lundqvist |
| 4,437,464 A | 3/1984 | Crow |
| 4,443,725 A | 4/1984 | Derderian et al. |
| 4,470,884 A | 9/1984 | Carr |
| 4,473,765 A | 9/1984 | Butman, Jr. et al. |
| 4,475,075 A | 10/1984 | Munn |
| 4,477,690 A | 10/1984 | Nikitin et al. |
| 4,481,438 A | 11/1984 | Keim |
| 4,484,106 A | 11/1984 | Taylor et al. |
| 4,488,079 A | 12/1984 | Dailey et al. |
| 4,490,651 A | 12/1984 | Taylor et al. |
| 4,503,284 A | 3/1985 | Minnick et al. |
| 4,508,251 A | 4/1985 | Harada et al. |
| 4,510,077 A | 4/1985 | Elton |
| 4,517,471 A | 5/1985 | Sachs |
| 4,520,287 A | 5/1985 | Wang et al. |
| 4,523,249 A | 6/1985 | Arimoto |
| 4,538,131 A | 8/1985 | Baier et al. |
| 4,546,210 A | 10/1985 | Akiba et al. |
| 4,551,780 A | 11/1985 | Canay |
| 4,552,990 A | 11/1985 | Persson et al. ........ 174/117 FF |
| 4,557,038 A | 12/1985 | Wcislo et al. |
| 4,560,896 A | 12/1985 | Vogt et al. |
| 4,565,929 A | 1/1986 | Baskin et al. |
| 4,571,453 A | 2/1986 | Takaoka et al. |
| 4,588,916 A | 5/1986 | Lis |
| 4,590,416 A | 5/1986 | Porche et al. |
| 4,594,630 A | 6/1986 | Rabinowitz et al. |
| 4,607,183 A | 8/1986 | Rieber et al. |
| 4,615,109 A | 10/1986 | Wcislo et al. |
| 4,615,778 A | 10/1986 | Elton |
| 4,618,795 A | 10/1986 | Cooper et al. |
| 4,619,040 A | 10/1986 | Wang et al. |
| 4,622,116 A | 11/1986 | Elton et al. |
| 4,633,109 A | 12/1986 | Feigel |
| 4,650,924 A | 3/1987 | Kauffman et al. |
| 4,652,963 A | 3/1987 | Fahlen |
| 4,656,316 A | 4/1987 | Meltsch |
| 4,656,379 A | 4/1987 | McCarty |
| 4,663,603 A | 5/1987 | van Riemsdijk et al. ..... 336/60 |
| 4,677,328 A | 6/1987 | Kumakura |
| 4,687,882 A | 8/1987 | Stone et al. |
| 4,692,731 A | 9/1987 | Osinga |
| 4,723,083 A | 2/1988 | Elton |
| 4,723,104 A | 2/1988 | Rohatyn |
| 4,724,345 A | 2/1988 | Elton et al. |
| 4,732,412 A | 3/1988 | van der Linden et al. |
| 4,737,704 A | 4/1988 | Kalinnikov et al. |
| 4,745,314 A | 5/1988 | Nakano |
| 4,761,602 A | 8/1988 | Leibovich |
| 4,766,365 A | 8/1988 | Bolduc et al. |
| 4,771,168 A | 9/1988 | Gundersen et al. |
| 4,785,138 A | 11/1988 | Brietenbach et al. |
| 4,795,933 A | 1/1989 | Sakai |
| 4,827,172 A | 5/1989 | Kobayashi |
| 4,845,308 A | 7/1989 | Womack, Jr. et al. |
| 4,847,747 A | 7/1989 | Abbondanti |
| 4,853,565 A | 8/1989 | Elton et al. |
| 4,859,810 A | 8/1989 | Cloetens et al. |
| 4,859,989 A | 8/1989 | McPherson |
| 4,860,430 A | 8/1989 | Raschbichler et al. |
| 4,864,266 A | 9/1989 | Feather et al. |
| 4,883,230 A | 11/1989 | Lindstrom |
| 4,890,040 A | 12/1989 | Gundersen |
| 4,894,284 A | 1/1990 | Yamanouchi et al. |
| 4,914,386 A | 4/1990 | Zocholl |
| 4,918,347 A | 4/1990 | Takaba |
| 4,918,835 A | 4/1990 | Wcislo et al. |
| 4,924,342 A | 5/1990 | Lee |
| 4,926,079 A | 5/1990 | Niemela et al. |
| 4,942,326 A | 7/1990 | Butler, III et al. |
| 4,949,001 A | 8/1990 | Campbell |
| 4,982,147 A | 1/1991 | Lauw |
| 4,994,952 A | 2/1991 | Silva et al. |
| 4,997,995 A | 3/1991 | Simmons et al. |
| 5,012,125 A | 4/1991 | Conway |
| 5,030,813 A | 7/1991 | Stanisz |
| 5,036,165 A | 7/1991 | Elton et al. |
| 5,036,238 A | 7/1991 | Tajima |
| 5,066,881 A | 11/1991 | Elton et al. |
| 5,067,046 A | 11/1991 | Elton et al. |
| 5,083,360 A | 1/1992 | Valencic et al. |
| 5,086,246 A | 2/1992 | Dymond et al. |
| 5,091,609 A | 2/1992 | Swada et al. |
| 5,094,703 A | 3/1992 | Takaoka et al. |
| 5,095,175 A | 3/1992 | Yoshida et al. |
| 5,097,241 A | 3/1992 | Smith et al. |
| 5,097,591 A | 3/1992 | Wcislo et al. |
| 5,111,095 A | 5/1992 | Hendershot |
| 5,124,607 A | 6/1992 | Rieber et al. |
| 5,136,459 A | 8/1992 | Fararooy |
| 5,140,290 A | 8/1992 | Dersch |
| 5,153,460 A | 10/1992 | Bovino et al. |
| 5,168,662 A | 12/1992 | Nakamura et al. |
| 5,171,941 A | 12/1992 | Shimizu et al. |
| 5,175,396 A | 12/1992 | Emery et al. ................. 174/36 |
| 5,182,537 A | 1/1993 | Thuis |
| 5,187,428 A | 2/1993 | Hutchison et al. |
| 5,231,249 A | 7/1993 | Kimura et al. |
| 5,235,488 A | 8/1993 | Koch |
| 5,246,783 A | 9/1993 | Spenadel et al. |
| 5,264,778 A | 11/1993 | Kimmel et al. |
| 5,287,262 A | 2/1994 | Klein |
| 5,293,146 A * | 3/1994 | Aosaki et al. .............. 336/206 |
| 5,304,883 A | 4/1994 | Denk |
| 5,305,961 A | 4/1994 | Errard et al. |

| | | | | | |
|---|---|---|---|---|---|
| 5,321,308 A | 6/1994 | Johncock | DE | 975999 | 1/1963 |
| 5,323,330 A | 6/1994 | Asplund et al. | DE | 1465719 | 5/1969 |
| 5,325,008 A | 6/1994 | Grant | DE | 1807391 | 5/1970 |
| 5,325,259 A | 6/1994 | Paulsson | DE | 2050674 | 5/1971 |
| 5,327,637 A | 7/1994 | Britenbach et al. | DE | 1638176 | 6/1971 |
| 5,341,281 A | 8/1994 | Skibinski | DE | 2155371 | 5/1973 |
| 5,343,139 A | 8/1994 | Gyugyi et al. | DE | 2400698 | 7/1975 |
| 5,355,046 A | 10/1994 | Weigelt | DE | 2520511 | 11/1976 |
| 5,365,132 A | 11/1994 | Hann et al. | DE | 2656389 | 6/1978 |
| 5,387,890 A | 2/1995 | Estop et al. | DE | 2721905 | 11/1978 |
| 5,397,513 A | 3/1995 | Steketee, Jr. | DE | 137164 | 8/1979 |
| 5,399,941 A | 3/1995 | Grothaus et al. | DE | 138840 | 11/1979 |
| 5,400,005 A | 3/1995 | Bobry | DE | 2824951 | 12/1979 |
| 5,408,169 A | 4/1995 | Jeanneret | DE | 2835386 | 2/1980 |
| 5,449,861 A | 9/1995 | Fujino et al. | DE | 2839517 | 3/1980 |
| 5,452,170 A | 9/1995 | Ohde et al. | DE | 2854520 | 6/1980 |
| 5,468,916 A | 11/1995 | Litenas et al. | DE | 3009102 | 9/1980 |
| 5,499,178 A | 3/1996 | Mohan | DE | 2913697 | 10/1980 |
| 5,500,632 A | 3/1996 | Halser, III | DE | 2920478 | 12/1980 |
| 5,510,942 A | 4/1996 | Bock et al. | DE | 3028777 | 3/1981 |
| 5,530,307 A | 6/1996 | Horst | DE | 2939004 | 4/1981 |
| 5,533,658 A | 7/1996 | Benedict et al. | DE | 3006382 | 8/1981 |
| 5,534,754 A | 7/1996 | Poumey | DE | 3008818 | 9/1981 |
| 5,545,853 A | 8/1996 | Hildreth | DE | 209313 | 4/1984 |
| 5,550,410 A | 8/1996 | Titus | DE | 3305225 | 8/1984 |
| 5,583,387 A | 12/1996 | Takeuchi et al. | DE | 3309051 | 9/1984 |
| 5,587,126 A | 12/1996 | Steketee, Jr. | DE | 3441311 | 5/1986 |
| 5,598,137 A | 1/1997 | Alber et al. | DE | 3543106 | 6/1987 |
| 5,607,320 A | 3/1997 | Wright | DE | 2917717 | 8/1987 |
| 5,612,510 A | 3/1997 | Hildreth | DE | 3612112 | 10/1987 |
| 5,663,605 A | 9/1997 | Evans et al. | DE | 3726346 | 2/1989 |
| 5,672,926 A | 9/1997 | Brandes et al. | DE | 3925337 | 2/1991 |
| 5,689,223 A | 11/1997 | Demarmels et al. | DE | 4023903 | 11/1991 |
| 5,807,447 A | 9/1998 | Forrest | DE | 4022476 | 1/1992 |
| 5,834,699 A | 11/1998 | Buck et al. | DE | 4233558 | 3/1994 |

FOREIGN PATENT DOCUMENTS

| | | | | | |
|---|---|---|---|---|---|
| | | | DE | 4402184 | 8/1995 |
| | | | DE | 4409794 | 8/1995 |
| CH | 534448 | 2/1973 | DE | 4412761 | 10/1995 |
| CH | 539328 | 7/1973 | DE | 4420322 | 12/1995 |
| CH | 646403 | 2/1979 | DE | 19620906 | 1/1996 |
| CH | 657482 | 8/1986 | DE | 4438186 | 5/1996 |
| CH | 1189322 | 10/1986 | DE | 19020222 | 3/1997 |
| DE | 40414 | 8/1887 | DE | 19547229 | 6/1997 |
| DE | 277012 | 7/1914 | DE | 468827 | 7/1997 |
| DE | 336418 | 6/1920 | DE | 134022 | 12/2001 |
| DE | 372390 | 3/1923 | EP | 049104 | 4/1982 |
| DE | 386561 | 12/1923 | EP | 0493704 | 4/1982 |
| DE | 387973 | 1/1924 | EP | 0056580 A1 | 7/1982 |
| DE | 406371 | 11/1924 | EP | 078908 | 5/1983 |
| DE | 425551 | 2/1926 | EP | 0120154 | 10/1984 |
| DE | 426793 | 3/1926 | EP | 0130124 | 1/1985 |
| DE | 432169 | 7/1926 | EP | 0142813 | 5/1985 |
| DE | 433749 | 9/1926 | EP | 0155405 | 9/1985 |
| DE | 435608 | 10/1926 | EP | 0102513 | 1/1986 |
| DE | 435609 | 10/1926 | EP | 0174783 | 3/1986 |
| DE | 441717 | 3/1927 | EP | 0185788 | 7/1986 |
| DE | 443011 | 4/1927 | EP | 0277358 | 8/1986 |
| DE | 460124 | 5/1928 | EP | 0234521 | 9/1987 |
| DE | 482506 | 9/1929 | EP | 0244069 | 11/1987 |
| DE | 501181 | 7/1930 | EP | 0246377 | 11/1987 |
| DE | 523047 | 4/1931 | EP | 0265868 | 5/1988 |
| DE | 568508 | 1/1933 | EP | 0274691 | 7/1988 |
| DE | 572030 | 3/1933 | EP | 0280759 | 9/1988 |
| DE | 584639 | 9/1933 | EP | 0282876 | 9/1988 |
| DE | 586121 | 10/1933 | EP | 0309096 | 3/1989 |
| DE | 604972 | 11/1934 | EP | 0314860 | 5/1989 |
| DE | 629301 | 4/1936 | EP | 0316911 | 5/1989 |
| DE | 673545 | 3/1939 | EP | 0317248 | 5/1989 |
| DE | 719009 | 3/1942 | EP | 0335430 | 10/1989 |
| DE | 846583 | 8/1952 | EP | 0342554 | 11/1989 |
| DE | 875227 | 4/1953 | EP | 0221404 | 5/1990 |

| | | | | | |
|---|---|---|---|---|---|
| EP | 0375101 | 6/1990 | GB | 1103099 | 2/1968 |
| EP | 0406437 | 1/1991 | GB | 1117401 | 6/1968 |
| EP | 0439410 | 7/1991 | GB | 1135242 | 12/1968 |
| EP | 0440865 | 8/1991 | GB | 1147049 | 4/1969 |
| EP | 0469155 A1 | 2/1992 | GB | 1157885 | 7/1969 |
| EP | 0490705 | 6/1992 | GB | 1174659 | 12/1969 |
| EP | 0503817 | 9/1992 | GB | 1236082 | 6/1971 |
| EP | 0571155 | 11/1993 | GB | 1268770 | 3/1972 |
| EP | 0620570 | 10/1994 | GB | 1319257 | 6/1973 |
| EP | 0620630 | 10/1994 | GB | 1322433 | 7/1973 |
| EP | 0642027 | 3/1995 | GB | 1340983 | 12/1973 |
| EP | 0671632 | 9/1995 | GB | 1341050 | 12/1973 |
| EP | 0676777 | 10/1995 | GB | 1365191 | 8/1974 |
| EP | 0677915 | 10/1995 | GB | 1395152 | 5/1975 |
| EP | 0684679 | 11/1995 | GB | 1424982 | 2/1976 |
| EP | 0684682 | 11/1995 | GB | 1426594 | 3/1976 |
| EP | 0695019 | 1/1996 | GB | 1438610 | 6/1976 |
| EP | 0732787 | 9/1996 | GB | 1445284 | 8/1976 |
| EP | 0738034 | 10/1996 | GB | 1479904 | 7/1977 |
| EP | 0739087 A2 | 10/1996 | GB | 1493163 | 11/1977 |
| EP | 0740315 | 10/1996 | GB | 1502938 | 3/1978 |
| EP | 0749190 A2 | 12/1996 | GB | 1525745 | 9/1978 |
| EP | 0751605 | 1/1997 | GB | 2000625 | 1/1979 |
| EP | 0739087 A3 | 3/1997 | GB | 1548633 | 7/1979 |
| EP | 0749193 A3 | 3/1997 | GB | 2046142 | 11/1979 |
| EP | 0780926 | 6/1997 | GB | 2022327 | 12/1979 |
| EP | 0802542 | 10/1997 | GB | 2025150 | 1/1980 |
| EP | 0913912 A1 | 5/1999 | GB | 2034101 | 5/1980 |
| FR | 805544 | 4/1936 | GB | 1574796 | 9/1980 |
| FR | 841351 | 1/1938 | GB | 2070341 | 9/1981 |
| FR | 847899 | 12/1938 | GB | 2070470 | 9/1981 |
| FR | 916959 | 12/1946 | GB | 2071433 | 9/1981 |
| FR | 1011924 | 4/1949 | GB | 2081523 | 2/1982 |
| FR | 1126975 | 3/1955 | GB | 2099635 | 12/1982 |
| FR | 1238795 | 7/1959 | GB | 2105925 | 3/1983 |
| FR | 2108171 | 5/1972 | GB | 2106306 | 4/1983 |
| FR | 2251938 | 6/1975 | GB | 2106721 | 4/1983 |
| FR | 2305879 | 10/1976 | GB | 2136214 | 9/1984 |
| FR | 2376542 | 7/1978 | GB | 2140195 | 11/1984 |
| FR | 2467502 | 4/1981 | GB | 2150153 | 6/1985 |
| FR | 2481531 | 10/1981 | GB | 2268337 | 1/1994 |
| FR | 2556146 | 6/1985 | GB | 2273819 | 6/1994 |
| FR | 2594271 | 8/1987 | GB | 2283133 | 4/1995 |
| FR | 2708157 | 1/1995 | GB | 2289992 | 12/1995 |
| GB | 123906 | 3/1919 | GB | 2308490 | 6/1997 |
| GB | 268271 | 3/1927 | GB | 2332557 | 6/1999 |
| GB | 293861 | 11/1928 | HU | 175494 | 11/1981 |
| GB | 292999 | 4/1929 | JP | 60206121 | 3/1959 |
| GB | 319313 | 7/1929 | JP | 57043529 | 8/1980 |
| GB | 518993 | 3/1940 | JP | 57126117 | 5/1982 |
| GB | 537609 | 6/1941 | JP | 59076156 | 10/1982 |
| GB | 540456 | 10/1941 | JP | 59159642 | 2/1983 |
| GB | 589071 | 6/1947 | JP | 6264964 | 9/1985 |
| GB | 666883 | 2/1952 | JP | 1129737 | 5/1989 |
| GB | 685416 | 1/1953 | JP | 62320631 | 6/1989 |
| GB | 702892 | 1/1954 | JP | 2017474 | 1/1990 |
| GB | 715226 | 9/1954 | JP | 3245748 | 2/1990 |
| GB | 723457 | 2/1955 | JP | 4179107 | 11/1990 |
| GB | 739962 | 11/1955 | JP | 318253 | 1/1991 |
| GB | 763761 | 12/1956 | JP | 424909 | 1/1992 |
| GB | 805721 | 12/1958 | JP | 5290947 | 4/1992 |
| GB | 827600 | 2/1960 | JP | 6196343 | 12/1992 |
| GB | 854728 | 11/1960 | JP | 6233442 | 2/1993 |
| GB | 870583 | 6/1961 | JP | 6325629 | 5/1993 |
| GB | 913386 | 12/1962 | JP | 7057951 | 8/1993 |
| GB | 965741 | 8/1964 | JP | 7264789 | 3/1994 |
| GB | 992249 | 5/1965 | JP | 8167332 | 12/1994 |
| GB | 1024583 | 3/1966 | JP | 7161270 | 6/1995 |
| GB | 1053337 | 12/1966 | JP | 8264039 | 11/1995 |
| GB | 1059123 | 2/1967 | JP | 9200989 | 1/1996 |
| GB | 1103098 | 2/1968 | JP | 8036952 | 2/1996 |

| | | | | | |
|---|---|---|---|---|---|
| JP | 8167360 | 6/1996 | WO | WO9745936 | 12/1997 |
| LU | 67199 | 3/1972 | WO | WO9745937 | 12/1997 |
| SE | 90308 | 9/1937 | WO | WO9745938 | 12/1997 |
| SE | 305899 | 11/1968 | WO | WO9745939 | 12/1997 |
| SE | 255156 | 2/1969 | WO | WO9747067 | 12/1997 |
| SE | 341428 | 12/1971 | WO | WO9820595 | 5/1998 |
| SE | 453236 | 1/1982 | WO | WO9820596 | 5/1998 |
| SE | 457792 | 6/1987 | WO | WO9820597 | 5/1998 |
| SE | 502417 | 12/1993 | WO | WO 98/20598 | 5/1998 |
| SU | 792302 | 1/1971 | WO | WO9820600 | 5/1998 |
| SU | 425268 | 9/1974 | WO | WO 98/20602 | 5/1998 |
| SU | 1019553 | 1/1980 | WO | WO9821385 | 5/1998 |
| SU | 694939 | 1/1982 | WO | PCT/FR 98/00468 | 6/1998 |
| SU | 955369 | 8/1983 | WO | WO9827634 | 6/1998 |
| SU | 1511810 | 5/1987 | WO | WO9827635 | 6/1998 |
| WO | WO8202617 | 8/1982 | WO | WO9827636 | 6/1998 |
| WO | WO8502302 | 5/1985 | WO | WO9829927 | 7/1998 |
| WO | WO9011389 | 10/1990 | WO | WO9829928 | 7/1998 |
| WO | WO9012409 | 10/1990 | WO | WO9829929 | 7/1998 |
| WO | PCT/DE 90/00279 | 11/1990 | WO | WO9829930 | 7/1998 |
| WO | WO9101059 | 1/1991 | WO | WO9829931 | 7/1998 |
| WO | WO9101585 | 2/1991 | WO | WO9829932 | 7/1998 |
| WO | WO9107807 | 3/1991 | WO | WO9833731 | 8/1998 |
| WO | PCT SE 91/00077 | 4/1991 | WO | WO9833736 | 8/1998 |
| WO | WO9109442 | 6/1991 | WO | WO9833737 | 8/1998 |
| WO | WO 91/11841 | 8/1991 | WO | WO9834238 | 8/1998 |
| WO | WO8115862 | 10/1991 | WO | WO 98/34239 | 8/1998 |
| WO | WO 91/15755 | 10/1991 | WO | WO9834240 | 8/1998 |
| WO | WO9201328 | 1/1992 | WO | WO9834241 | 8/1998 |
| WO | WO9203870 | 3/1992 | WO | WO9834242 | 8/1998 |
| WO | WO9321681 | 10/1993 | WO | WO9834243 | 8/1998 |
| WO | WO9406194 | 3/1994 | WO | WO9834244 | 8/1998 |
| WO | WO9518058 | 7/1995 | WO | WO9834245 | 8/1998 |
| WO | WO9522153 | 8/1995 | WO | WO9834246 | 8/1998 |
| WO | WO9524049 | 9/1995 | WO | WO9834247 | 8/1998 |
| WO | WO9622606 | 7/1996 | WO | WO9834248 | 8/1998 |
| WO | WO9622607 | 7/1996 | WO | WO9834249 | 8/1998 |
| WO | PCT/CN 96/00010 | 10/1996 | WO | WO9834250 | 8/1998 |
| WO | WO9630144 | 10/1996 | WO | WO9834309 | 8/1998 |
| WO | WO9710640 | 3/1997 | WO | WO9834312 | 8/1998 |
| WO | WO9711831 | 4/1997 | WO | WO9834315 | 8/1998 |
| WO | WO9716881 | 5/1997 | WO | WO9834321 | 8/1998 |
| WO | WO 97/29494 | 8/1997 | WO | WO9834322 | 8/1998 |
| WO | WO9745288 | 12/1997 | WO | WO9834323 | 8/1998 |
| WO | WO9745847 | 12/1997 | WO | WO9834325 | 8/1998 |
| WO | WO9745848 | 12/1997 | WO | WO9834326 | 8/1998 |
| WO | WO9745906 | 12/1997 | WO | WO9834327 | 8/1998 |
| WO | WO9745907 | 12/1997 | WO | WO9834328 | 8/1998 |
| WO | WO 97/45908 | 12/1997 | WO | WO9834329 | 8/1998 |
| WO | WO9745912 | 12/1997 | WO | WO9834330 | 8/1998 |
| WO | WO9745914 | 12/1997 | WO | WO9834331 | 8/1998 |
| WO | WO9745915 | 12/1997 | WO | WO 98/40627 | 9/1998 |
| WO | WO9745916 | 12/1997 | WO | WO 98/43336 | 10/1998 |
| WO | WO9745918 | 12/1997 | WO | WO9917309 | 4/1999 |
| WO | WO9745919 | 12/1997 | WO | WO9917311 | 4/1999 |
| WO | WO9745920 | 12/1997 | WO | WO9917312 | 4/1999 |
| WO | WO9745921 | 12/1997 | WO | WO9917313 | 4/1999 |
| WO | WO9745922 | 12/1997 | WO | WO9917314 | 4/1999 |
| WO | WO9745923 | 12/1997 | WO | WO9917315 | 4/1999 |
| WO | WO9745924 | 12/1997 | WO | WO9917316 | 4/1999 |
| WO | WO9745925 | 12/1997 | WO | WO9917422 | 4/1999 |
| WO | WO9745926 | 12/1997 | WO | WO9917424 | 4/1999 |
| WO | WO9745927 | 12/1997 | WO | WO9917425 | 4/1999 |
| WO | WO9745928 | 12/1997 | WO | WO9917426 | 4/1999 |
| WO | WO9745929 | 12/1997 | WO | WO9917427 | 4/1999 |
| WO | WO9745930 | 12/1997 | WO | WO9917428 | 4/1999 |
| WO | WO9745931 | 12/1997 | WO | WO9917429 | 4/1999 |
| WO | WO9745932 | 12/1997 | WO | WO9917432 | 4/1999 |
| WO | WO9745933 | 12/1997 | WO | WO9917433 | 4/1999 |
| WO | WO9745934 | 12/1997 | WO | WO9919963 | 4/1999 |
| WO | WO9745935 | 12/1997 | WO | WO9919969 | 4/1999 |

| | | |
|---|---|---|
| WO | WO9919970 | 4/1999 |
| WO | PCT/SE 98/02148 | 6/1999 |
| WO | WO9927546 | 6/1999 |
| WO | WO9928919 | 6/1999 |
| WO | WO9928921 | 6/1999 |
| WO | WO 99/28922 | 6/1999 |
| WO | WO9928923 | 6/1999 |
| WO | WO9928924 | 6/1999 |
| WO | WO9928925 | 6/1999 |
| WO | WO9928926 | 6/1999 |
| WO | WO9928927 | 6/1999 |
| WO | WO9928928 | 6/1999 |
| WO | WO9928929 | 6/1999 |
| WO | WO9928930 | 6/1999 |
| WO | WO9928931 | 6/1999 |
| WO | WO9928934 | 6/1999 |
| WO | WO9928994 | 6/1999 |
| WO | WO9929005 | 6/1999 |
| WO | WO 99/29005 | 6/1999 |
| WO | WO9929008 | 6/1999 |
| WO | WO9929011 | 6/1999 |
| WO | WO9929012 | 6/1999 |
| WO | WO9929013 | 6/1999 |
| WO | WO9929014 | 6/1999 |
| WO | WO9929015 | 6/1999 |
| WO | WO9929016 | 6/1999 |
| WO | WO9929017 | 6/1999 |
| WO | WO9929018 | 6/1999 |
| WO | WO9929019 | 6/1999 |
| WO | WO9929020 | 6/1999 |
| WO | WO9929021 | 6/1999 |
| WO | WO9929022 | 6/1999 |
| WO | WO 99/29023 | 6/1999 |
| WO | WO9929024 | 6/1999 |
| WO | WO 99/29025 | 6/1999 |
| WO | WO9929026 | 6/1999 |
| WO | WO9929029 | 6/1999 |
| WO | WO9929034 | 6/1999 |

OTHER PUBLICATIONS

High Voltage Cables in a New Class of Generators Powerformer; M. Leijon et al; Jun. 14, 1999; pp1–8.

Ohne Tranformator direkt ins Netz; Owman et al, ABB, AB; Feb. 8, 1999; pp48–51.

Submersible Motors and Wet–Rotor Motors for Centrifugal Pumps Submerged in the Fluid Handled; K.. Bienick, KSB; Feb. 25, 1988; pp9–17.

High Voltage Generators; G. Beschastnov et al; 1977; vol. 48. No. 6 pp1–7.

Eine neue Type von Unterwassermotoren; Electrotechnik und Maschinenbam, 49; Aug. 1931; pp2–3.

Problems in design of the 110–5OokV high–voltage generators; Nikiti et al; World Electrotechnical Congress; Jun. 21–27, 1977; Section 1. Paper #18.

Manufacture and Testing of Roebel bars; P. Marti et al; 1960, Pub.86, vol. 8, pp 25–31.

Hydroalternators of 110 to 220 kV Elektrotechn. Obz., vol. 64, No. 3, pp132–136 Mar. 1975; A. Abramov.

Design Concepts for an Amorphous Metal Distribution Transformer; E. Boyd et al; IEEE 11/84.

Neue Wege zum Bau zweipoliger Turbogeneratoren bis 2 GVA, 6OkV Elektrotechnik und. Maschinenbau Wien Janner 1972, Heft 1, Seite 1–11; G. Aichholzer.

Optimizing designs of water–resistant magnet wire; V. Kuzenev et al; Elektrotekhnika, vol. 59, No. 12, pp35–40, 1988.

Zur Entwicklung der Tauchpumpenmotoren; A. Schanz; KSB, pp19–24.

Direct Generation of alternating current at high voltages; R. Parsons; IEEE Journal, vol. 67 #393, Jan. 15, 1929; pp1065–1080.

Stopfbachslose Umwalzpumpen– ein wichtiges Element im modernen Kraftwerkbau; H. Holz, KSB 1, pp13–19, 1960.

Zur Geschichte der Brown Boveri–Synchron–Maschinen; Vierzig Jahre Generatorbau; Jan.–Feb. 1931 pp15–39.

Technik und Anwendung moderner Tauchpumpen; A. Heumann; 1987.

High capacity synchronous generator having no tooth stator; V.S. Kildishev et al; No. 1, 1997 pp11–16.

Der Asynchronmotor als Antrieb stopfbcichsloser Pumpen; E. Picmaus; Eletrotechnik und Maschinenbay No. 78; pp153–155, 1961.

Low core loss rotating flux transformer; R. F. Krause, et al; American Institute Physics J.Appl.Phys vol. 64 #10 Nov. 1998, pp5376–5378.

An EHV bulk Power transmission line Made with Low Loss XLPE Cable;Ichihara et al; 8/92; pp3–6.

Underground Transmission Systems Reference Book; 1992;pp16–19; pp36–45; pp67–81.

Power System Stability and Control; P. Kundur, 1994; pp23–25;p. 767.

Six phase Synchronous Machine with AC and DC Stator Connections, Part II:Harmonic Studies and a proposed Uninterruptible Power Supply Scheme; R. Schiferl et al.;Aug. 1983 pp 2694–2701.

Six phase Synchronous Machine with AC and DC Stator Connections, Part 1: Equivalent circuit representation and Steady–State Analysis; R. Schiferl et al; Aug. 1983; pp2685–2693.

Reactive Power Compensation; T. Petersson; 1993; pp 1–23.

Permanent Magnet Machines; K. Binns; 1987; pp 9–1 through 9–26.

Hochspannungsaniagen for Wechselstrom; 97. Hochspannungsaufgaben an Generatoren und Motoren; Roth et al; 1938; pp452–455.

Hochspannungsanlagen for Wechselstrom; 97. Hochspannungsaufgaben an Generatoren und Motoren; Roth et al; Spring 1959, pp30–33.

Neue Lbsungswege zum Entwurf grosser Turbogeneratoren bis 2GVA, 6OkV; G. Aicholzer; Sep. 1974, pp249–255.

Advanced Turbine–generators—an assessment; A. Appleton, et al; International Conf. Proceedings, Lg HV Elec. Sys. Paris, FR, Aug.–Sep. 1976, vol. I, Section 11–02, p. 1–9.

Fully slotless turbogenerators; E. Spooner; Proc., IEEE vol. 120 #12, Dec. 1973.

Toroidal winding geometry for high voltage superconducting alternators; J. Kirtley et al; MIT—Elec. Power Sys. Engrg. Lab for IEEE PES;Feb. 1974.

High–Voltage Stator Winding Development; D. Albright et al; Proj. Report EL339, Project 1716, Apr. 1984.

POWERFORMER ™: A giant step in power plant engineering; Owman et al; CIGRE 1998, Paper 11:1.1.

Thin Type DC/DC Converter using a coreless wire transformer; K. Onda et al; Proc. IEEE Power Electronics Spec. Conf.; Jun. 1994, pp330–334.

Development of extruded polymer insulated superconducting cable; Jan. 1992.

Transformer core losses; B. Richardson; Proc. IEEE May 1986, pp365–368.

Cloth–transformer with divided windings and tension annealed amorphous wire; T. Yammamoto et al; IEEE Translation Journal on Magnetics in Japan vol. 4, No. 9 Sep. 1989.

A study of equipment sizes and constraints for a unified power flow controller; J Bian et al; IEEE 1996.

A test installation of a self–tuned ac filter in the Konti–Skan 2 HVDC link; T. Holmgren,G. Asplund, S. Valdemarsson, P. Hidman of ABB; U. Jonsson of Svenska Kraftnat; O. Ioof of Vattenfall Vastsverige AB; IEEE Stockholm Power Tech Conference Jun. 1995, pp 64–70.

Analysis of faulted Power Systems; P Anderson, Iowa State University Press / Ames, Iowa, 1973, pp 255–257.

36–Kv. Generators Arise from Insulation Research; P. Sidler; *Electrical World* Oct. 15, 1932, ppp 524.

Oil Water cooled 300 MW turbine generator;L.P. Gnedin et al;*Elektrotechnika* ,1970, pp 6–8.

J&P Transformer Book 11$^{th}$ Edition;A. C. Franklin et al; owned by Butterworth—Heinemann Ltd, Oxford Printed by Hartnolls Ltd in Great Britain 1983, pp29–67.

Transformerboard; H.P. Moser et al; 1979, pp 1–19.

The Skagerrak transmission—the world's longest HVDC submarine cable link; L. Haglof et al of ASEA; ASEA Journal vol. 53, No. 1–2, 1980, pp 3–12.

Direct Connection of Generators to HVDC Converters: Main Characteristics and Comparative Advantages; J.Arrillaga et al; *Electra* No. 149, Aug. 1993, pp 19–37.

Our flexible friend article; M. Judge; *New Scientist*, May 10, 1997, pp 44–48.

In–Service Performance of HVDC Converter transformers and oil–cooled smoothing reactors; G.L. Desilets et al; *Electra* No. 155, Aug. 1994, pp 7–29.

Transformateurs a courant continu haute tension–examen des specifications; A. Lindroth et al; *Electra* No. 141, Apr. 1992, pp 34–39.

Development of a Termination for the 77 kV–Class High Tc Superconducting Power Cable; T. Shimonosono et al; IEEE Power Delivery, vol. 12, No. 1, Jan. 1997, pp 33–38.

Verification of Limiter Performance in Modern Excitation Control Systems; G. K. Girgis et al; IEEE Energy Conservation, vol. 10, No. 3, Sep. 1995, pp 538–542.

A High Initial response Brushless Excitation System; T. L. Dillman et al; IEEE Power Generation Winter Meeting Proceedings, Jan. 31, 1971, pp 2089–2094.

Design, manufacturing and cold test of a superconducting coil and its cryostat for SMES applications; A. Bautista et al; IEEE Applied Superconductivity, vol. 7, No. 2, Jun. 1997, pp 853–856.

Quench Protection and Stagnant Normal Zones in a Large Cryostable SMES; Y. Lvovsky et al; IEEE Applied Superconductivity, vol. 7, No. 2, Jun. 1997, pp 857–860.

Design and Construction of the 4 Tesla Background Coil for the Navy SMES Cable Test Apparatus; D.W.Scherbarth et al; IEEE Appliel Superconductivity, vol. 7, No. 2, Jun. 1997, pp 840–843.

High Speed Synchronous Motors Adjustable Speed Drives; ASEA Generation Pamphlet OG 135–101 E, Jan. 1985, pp 1–4.

Billig burk motar overtonen; A. Felldin; *ERA* (TEKNIK) Aug. 1994, pp 26–28.

400–kV XLPE cable system passes CIGRE test; ABB Article; ABB Review Sep. 1995, pp 38.

FREQSYN—a new drive system for high power applications;J–A. Bergman et al; ASEA Journal 59, Apr. 1986, pp16–19.

Canadians Create Conductive Concrete; J. Beaudoin et al; *Science*, vol. 276, May 23, 1997, pp 1201.

Fully Water–Cooled 190 MVA Generators in the Tonstad Hydroelectric Power Station; E. Ostby et al; BBC Review Aug. 1969, pp 380–385.

Relocatable static var compensators help control unbundled power flows; R. C. Knight et al; *Transmission & Distribution*, Dec. 1996, pp 49–54.

Investigation and Use of Asynchronized Machines in Power Systems*; N.I.Blotskii et al; *Elektrichestvo*, No. 12, 1–6, 1985, pp 90–99.

Variable–speed switched reluctance motors; P.J. Lawrenson et al; IEE proc, vol. 127, Pt.B, No. 4, Jul. 1980, pp 253–265.

Das Einphasenwechselstromsystem hoherer Frequenz; J.G. Heft; Elektrische Bahnen eb; Dec. 1987, pp 388–389.

Power Transmission by Direct Current;E. Uhlmann;ISBN 3–540–07122–9 Springer–Verlag, Berlin/Heidelberg/New York; 1975, pp 327–328.

Elektriska Maskiner; F. Gustavson; Institute for Elkreafteknilk, KTH; Stockholm, 1996, pp 3–6—3–12.

Die Wechselstromtechnik; A. Cour' Springer Verlag, Germany; 1936, pp 586–598.

Insulation systems for superconducting transmission cables; O.Toennesen; Nordic Insulation Symposium, Bergen, 1996, pp 425–432.

MPTC: An economical alternative to universal power flow controllers;N. Mohan; EPE 1997, Trondheim, pp 3.1027–3.1030.

Lexikon der Technik; Luger; Band 2, Grundlagen der Elektrotechnik und Kerntechnik, 1960, pp 395.

Das Handbuch der Lokomotiven ( hungarian locomotive V40 1'D'); B. Hollingsworth et al; Pawlak Verlagsgesellschaft; 1933, pp. 254–255.

Synchronous machines with single or double 3–phase star–connected winding fed by 12–pulse load commutated inverter. Simulation of operational behaviour; C. Ivarson et al; ICEM 1994, International Conference on electrical machines, vol. 1, pp 267–272.

Elkrafthandboken, Elmaskiner; A. Rejminger; Elkrafthandboken, Elmaskiner 1996, 15–20.

Power Electronics—in Theory and Practice; K. Thorborg; ISBN 0–86238–341–2, 1993, pp 1–13.

Regulating transformers in power systems—new concepts and applications; E. Wirth et al; ABB Review Apr. 1997, p 12–20.

Tranforming transformers; S. Mehta et al; *IEEE Spectrum*, Jul. 1997, pp. 43–49.

A study of equipment sizes and constraints for a unified power flow controller; J. Bian et al; IEEE Transactions on Power Delivery, vol. 12, No. 3, Jul. 1997, pp. 1385–1391.

Industrial High Voltage; F.H. Kreuger; *Industrial High Voltage* 1991 vol. I, pp. 113–117.

Hochspannungstechnik; A. Küchler; Hochspannungstechnik, VDI Verlag 1996, pp. 365–366, ISBN 3–18–401530–0 or 3–540–62070–2.

High Voltage Engineering; N.S. Naidu; High Voltage Engineering ,second edition 1995 ISBN 0–07–462286–2, Chapter 5, pp91–98.

Performance Characteristics of a Wide Range Induction Type Frequency Converter; G.A. Ghoneem; Ieema Journal, Sep. 1995, pp. 21–34.

International Electrotechnical Vocabulary, Chapter 551 Power Electronics;unknown author; International Electrotechnical Vocabulary Chapter 551: Power Electronics Bureau Central de la Commission Electrotechnique Internationale, Geneve; 1982, pp1–65.

Design and manufacture of a large superconducting homopolar motor; A.D. Appleton; IEEE Transactions on Magnetics, vol. 19,No. 3, Part 2, May 1983, pp 1048–1050.

Application of high temperature superconductivy to electric motor design; J.S. Edmonds et al; IEEE Transactions on Energy Conversion Jun. 1992, No. 2 , pp 322–329.

Power Electronics and Variable Frequency Drives; B. Bimal; IEEE Industrial Electronics—Technology and Applications, 1996, pp. 356.

Properties of High Plymer Cement Mortar; M. Tamai et al; *Science & Technology in Japan*, No. 63 ; 1977, pp 6–14.

Weatherability of Polymer–Modified Mortars after Ten–Year Outdoor Exposure in Koriyama and Sapporo; Y. Ohama et al; *Science & Technology in Japan* No. 63; 1977, pp 26–31.

SMC Powders Open New Magnetic Applications; M. Persson (Editor); *SMC Update* ,vol. 1, No. 1, Apr. 1997.

Characteristics of a laser triggered spark gap using air, Ar, CH4,H2, He, N2, SF6 and Xe; W.D. Kimura et al; Journal of Applied Physics, vol. 63, No. 6, Mar. 15, 1988, p. 1882–1888.

Low–intensy laser–triggering of rail–gaps with magnesium–aerosol switching–gases; W. Frey; 11th International Pulse Power Conference, 1997, Baltimore, USA Digest of Technical Papers, p. 322–327.

* cited by examiner

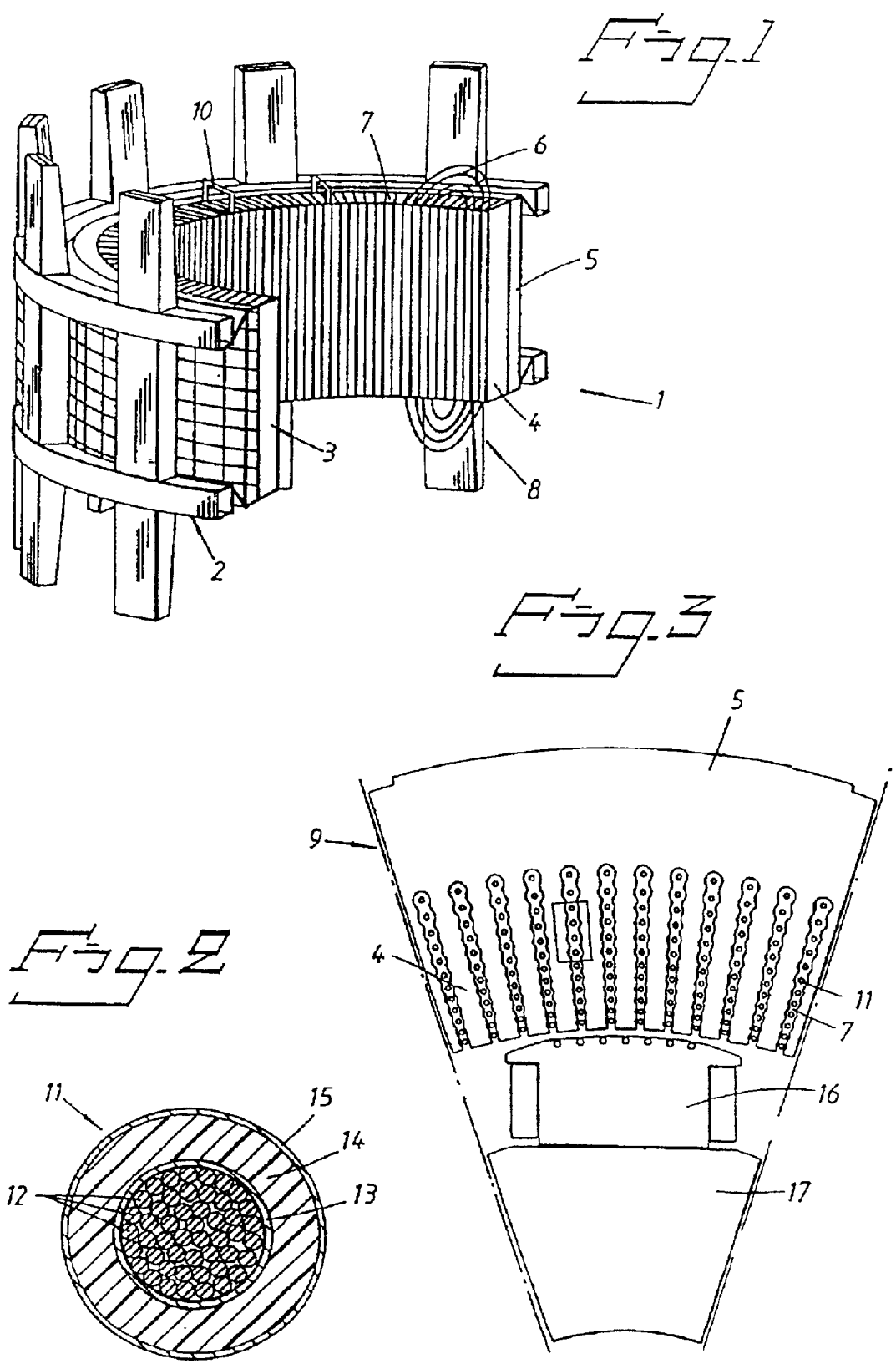

METHOD OF APPLYING A TUBE MEMBER IN A STATOR SLOT IN A ROTATING ELECTRICAL MACHINE

BACKGROUND OF THE INVENTION

1. Field of the Invention

The present invention relates to rotating electric machines such as synchronous machines. It also relates to double-fed machines, applications in asynchronous static current converter cascades, external pole machines and synchronous flux machines, as well as to alternating current machines intended primarily as generators in a power station for generating electric power. The invention particularly relates to the stator in such machines and a method for fixing the windings, as well as cooling the stator teeth and the insulated electric conductor constituting the stator winding.

2. Discussion of the Background

Similar machines have conventionally been designed for voltages in the range 15–30 kV, and 30 kV has normally been considered to be an upper limit. This generally means that a generator must be connected to the power network via a transformer which steps up the voltage to the level of the power network, which is in the range of approximately 130–400 kV. The present invention is intended primarily for use with high voltages. High voltages shall be understood here to mean voltages in excess of 10 kV. A typical operating range for the machine according to the invention may be voltages from 36 kV up to 800 kV. The invention is secondarily intended for use in the stated technical area at voltages below 36 kV.

Two different air-cooled systems exist for conventional cooling: radial cooling where the air passes the rotor through the hub and radial channels in the rotor, and axial cooling where the air is blown into the pole gaps by axial fans. The stator is divided into radial air ducts created by (often straight) spacers that are welded in place. Due to the poor thermal conductivity axially through the stator laminations the air ducts must be frequently repeated. The drawback with air-cooling is that the ventilation losses are considerable and that, because of the ventilation ducts, the stator becomes longer. Furthermore, particularly with said high-voltage generators with long teeth, the ventilation ducts may also weaken the structure mechanically.

Axial liquid cooling, e.g. water-cooling, through cooling tubes, e.g. of metal, in the stator yoke has been known for some time. One drawback is that eddy currents are induced in metal tubes if they are present in a magnetic flux varying with time, thus leading to certain power losses when used in an electric machine.

SUMMARY OF THE INVENTION

The object of the present invention is to provide a method for mounting a cooling tube in a cooling tube channel, and also a rotating electric machine having cooling tubes mounted using this method in conjunction with direct cooling of the stator and particularly the stator teeth in such a machine.

Another object of the invention is to eliminate ventilation ducts, thereby resulting in shorter and stronger stators, at the same time as ensuring that the magnetic flux in the stator teeth is disturbed as little as possible by said cooling. The object is also to achieve a higher degree of efficiency.

A further object of the invention is to achieve a steady fixing of the cables in the stator slots by these cooling tubes.

The above-mentioned object is achieved by the method and the arrangement in accordance with the invention having the features described herein.

By using high-voltage insulated electric conductors with solid insulation similar to that used in cables for transmitting electric power (e.g. XLPE-cables) the voltage of the machine can be increased to such levels that it can be connected directly to the power network without an intermediate transformer. The conventional transformer can thus be eliminated. The concept generally requires the slots in which the cables are placed in the stator to be deeper than with conventional technology (thicker insulation due to higher voltage and more turns in the winding). This means that the distribution of losses differs from that in a conventional machine, which in turn entails new problems in cooling the stator, for instance, and particularly the stator teeth.

The insulated conductor or high-voltage cable used in the present invention is flexible and is of the type described in more detail in WO 97/45919 and WO 97/45847. The insulated conductor or cable is described further in WO 97/45918, WO 97/45930 and WO 97/45931.

Thus, in the device in accordance with the invention the windings are preferably of a type corresponding to cables having solid, extruded insulation, like, those currently used for power distribution, such as XLPE-cables or cables with EPR-insulation. Such a cable has an inner conductor composed of one or more strand parts, an inner semiconducting layer surrounding the conductor, a solid insulating layer surrounding this and an outer semiconducting layer surrounding the insulating layer. Such cables are flexible, which is an important property in this context since the technology for the device according to the invention is based primarily on winding systems in which the winding is formed from conductors which are bent during assembly. The flexibility of a XLPE-cable normally corresponds to a radius of curvature of approximately 20 cm for a cable 30 mm in diameter, and a radius of curvature of approximately 65 cm for a cable 80 mm in diameter. In the present application the term "flexible" is used to indicate that the winding is flexible down to a radius of curvature in the order of four times the cable diameter, preferably eight to twelve times the cable diameter.

The winding should be constructed to retain its properties even when it is bent and when it is subjected to thermal or mechanical stress during operation. It is vital that the layers retain their adhesion to each other in this context. The material properties of the layers are decisive here, particularly their elasticity and relative coefficients of thermal expansion. In a XLPE-cable, for instance, the insulating layer is made of cross-linked, low-density polyethylene, and the semiconducting layers are made of polyethylene with soot and metal particles mixed in. Changes in volume as a result of temperature fluctuations are completely absorbed as changes in radius in the cable and, thanks to the comparatively slight difference between the coefficients of thermal expansion in the layers in relation to the elasticity of these materials, the radial expansion can take place without the adhesion between the layers being lost.

The material combinations stated above should be considered only as examples. Other combinations fulfilling the conditions specified and also the condition of being semiconducting, i.e. having a resistivity within the range of 10-1 -106 ohm-cm, e.g. 1–500 ohm-cm, or 10–200 ohm-cm, naturally also fall within the scope of the invention.

The inner and outer semiconducting layers may be of the same basic material but with particles of conducting material such as soot or metal powder mixed in.

The mechanical properties of these materials, particularly their coefficients of thermal expansion, are affected relatively little by whether soot or metal powder is mixed in or not—at least in the proportions required to achieve the conductivity necessary according to the invention. The insulating layer and the semiconducting layers thus have substantially the same coefficients of thermal expansion.

Ethylene-vinyl-acetate copolymer/nitrile rubber, butylymp polyethylene, ethylene-acrylate-copolymers and ethylene-ethyl-acrylate copolymers may also constitute suitable polymers for the semiconducting layers.

Even when different types of material are used as base in the various layers, it is desirable for their coefficients of thermal expansion to be substantially the same. This is the case with the combination of the materials listed above.

The materials listed above have relatively good elasticity, with an E-modulus of E<500 MPa, preferably <200 MPa. The elasticity is sufficient for any minor differences between the coefficients of thermal expansion for the materials in the layers to be absorbed in the radial direction of the elasticity so that no cracks or other damage appear and so that the layers are not released from each other. The material in the layers is elastic, and the adhesion between the layers is at least of the same magnitude as in the weakest of the materials.

The conductivity of the two semiconducting layers is sufficient to substantially equalize the potential along each layer. The conductivity of the outer semiconducting layer is sufficiently large to contain the electrical field in the cable, but at the same time sufficiently small not to give rise to significant losses due to currents induced in the longitudinal direction of the layer.

Thus, each of the two semiconducting layers essentially constitutes one equipotential surface, and the winding composed of these layers will substantially enclose the electrical field within it.

There is, of course, nothing to prevent one or more additional semiconducting layers being arranged in the insulating layer.

The invention relates to a method for fixing the cable in a high-voltage generator by a pre-shaped triangular tube of XLPE that during operation is to also used for cooling the windings and the tooth section of the stator core. At the assembly, the pre-shaped tube is inserted into the triangular space between cables and tooth. The shape of the tube should provide enough clearance to permit easy insertion of the tube. When the tube is in place, it is heated to a temperature of 125–130°C. at which it may be shaped. Moreover, an over-pressure is applied to the inside of the tube in order to press the tube against the cables and the slot wall. Both heating and pressurizing of the tube are achieved by heating and pressurizing a pressure medium, causing the tube to soften and expand, whereby its outer periphery assumes a shape fitting against cables and slot wall. While retaining the overpressure, the tube is then cooled by exchanging the warm pressure medium against a cold pressure medium, e.g. cold water, which fills the expanded tube and causes it to solidify and permanently assume this expanded shape. The tube will now act as an elastic element, absorbing the thermal expansion of the cables during operation. The tube is also used as a cooling tube during operation, the overpressure of the cooling medium providing a steadying pressure on the cables. This pressure against cables and the slot wall improves the heat transfer as well. The tubes are placed against one of the slot walls in every or every other cable interspace.

The invention also relates to a rotating electric machine provided with cooling tubes that can also fix the position of the cable that are mounted by this method.

The machine has axially running cooling tubes made of a dielectric material, e.g. a polymer, and drawn through the triangular cable interspaces in the stator teeth. The tubes are expanded in the interspaces so that good heat transfer occurs when coolant is circulated in the tubes. The tubes run in the stator yoke and in the stator teeth along the entire axial length of the stator and, if necessary, they can be spliced in the stator teeth.

Polymer cooling tubes are non-conducting and the risk of short-circuiting is therefore eliminated, nor can eddy currents occur in them. Polymer cooling tubes can also be bent cold and drawn through several cooling tube channels without splicing, which is a great advantage.

Polymer cooling tubes can be produced from many materials, such as polyethylene, polypropene, polybutene, polyvinylidene fluoride, polytetrafluoroethylene, as well as filled and reinforced elastomers. Of these materials, polyethylene with high density, HDPE, is preferred since its thermal conductivity increases with increased density. If the polyethylene is cross-linked, which can be achieved by splitting a peroxide, silane cross-linking or radiation patterning, its ability to withstand pressure at increased temperature is enhanced, at the same time as the risk of voltage corrosion disappears. Cross-linked polyethylene, e.g. XLPE tubing from Wirsbo bruks AB, is used, for instance, for water pipes.

In a method and a device in accordance with the invention, the windings are preferably of a type corresponding to cables having solid, extruded insulation, like those currently used for power distribution, such as XLPE-cables or cables with EPR-insulation. Such a cable has an inner conductor composed of one or more strand parts, an inner semiconducting layer surrounding the conductor, a solid insulating layer surrounding this and an outer semiconducting layer surrounding the insulating layer. Such cables are flexible, which is an important property in this context since the technology for the device according to the invention is based primarily on winding systems in which the winding is drawn back and forth in a plurality of turns, i.e. without being spliced at the coil ends as required when the winding in the core consists of rigid conductors. The flexibility of a XLPE-cable normally corresponds to a radius of curvature of approximately 20 cm for a cable 30 mm in diameter, and a radius of curvature of approximately 65 cm for a cable 80 mm in diameter. In the present application the term "flexible" is used to indicate that the winding is flexible down to a radius of curvature in the order of eight to twenty-five times the cable diameter.

The winding should be constructed to retain its properties even when it is bent and when it is subjected to thermal stress during operation. It is vital that the layers retain their adhesion to each other in this context. The material properties of the layers are decisive here, particularly their elasticity and relative coefficients of thermal expansion. In a XLPE-cable, for instance, the insulating layer is made of cross-linked, low-density polyethylene, and the semiconducting layers are made of polyethylene with soot and metal particles mixed in. Changes in volume as a result of temperature fluctuations are completely absorbed as changes in radius in the cable and, thanks to the comparatively slight difference between the coefficients of thermal expansion in the layers in relation to the elasticity of these materials, the radial expansion can take place without the adhesion between the layers being lost.

The material combinations stated above should be considered only as examples. Other combinations fulfilling the conditions specified and also the condition of being semiconducting, i.e. having a conductivity within the range of 1–105 ohm-cm, and being insulating respectively, i.e. with a conductivity less than 105 ohm-cm.

For example, the insulating layer may be made of a solid thermoplastic material such as low density polyethylene (LDPE), high density polyethylene (HDPE), polypropylene (PP), polybutylene (PB), polymethyl-pentene (PMP), cross-linked materials such as cross-linked polyethylene (XLPE), or rubber such as ethylene-propylene rubber (EPR) or silicone rubber.

The inner and outer semiconducting layers may be of the same basic material but with particles of conducting material such as soot or metal powder mixed in.

The mechanical properties of these materials, particularly their coefficients of thermal expansion, are affected relatively little by whether soot or metal powder is mixed in or not. The insulating layer and the semiconducting layers thus have substantially the same coefficients of thermal expansion.

Ethylene-vinyl-acetate copolymer/nitrile rubber, butylymp polyethylene, ethylene-acrylate-copolymers and ethylene-ethyl-acrylate copolymers may also constitute suitable polymers for the semiconducting layers.

Even when different types of material are used as base in the various layers, it is desirable for their coefficients of thermal expansion to be substantially the same. This is the case with the combination of the materials listed above.

The materials listed above have an elasticity which is sufficient to absorb minor differences between the coefficients of thermal expansion for the materials in the layers in the radial direction of the elasticity, so that no cracks or other damage appear, and so that the layers are not released from each other.

The conductivity of the two semiconducting layers is sufficient to substantially equalize the potential along each layer. At the same time, the conductivity is so small that the outer semiconducting layer has sufficient resistivity to contain the electrical field in the cable.

Thus, each of the two semiconducting layers essentially constitutes one equipotential surface, and the winding composed of these layers will substantially enclose the electrical field within it.

There is, of course, nothing to prevent one or more additional semiconducting layers being arranged in the insulating layer.

BRIEF DESCRIPTION OF THE DRAWINGS

The invention will now be described in more detail with reference designations as in the accompanying drawings.

FIG. 1 shows schematically a perspective view of a section diagonally through the stator of a rotating electric machine;

FIG. 2 shows a cross section through a high-voltage cable in accordance with the present invention;

FIG. 3 shows schematically a sector of a rotating electric machine;

DESCRIPTION OF THE PREFERRED EMBODIMENTS

Figure 4:
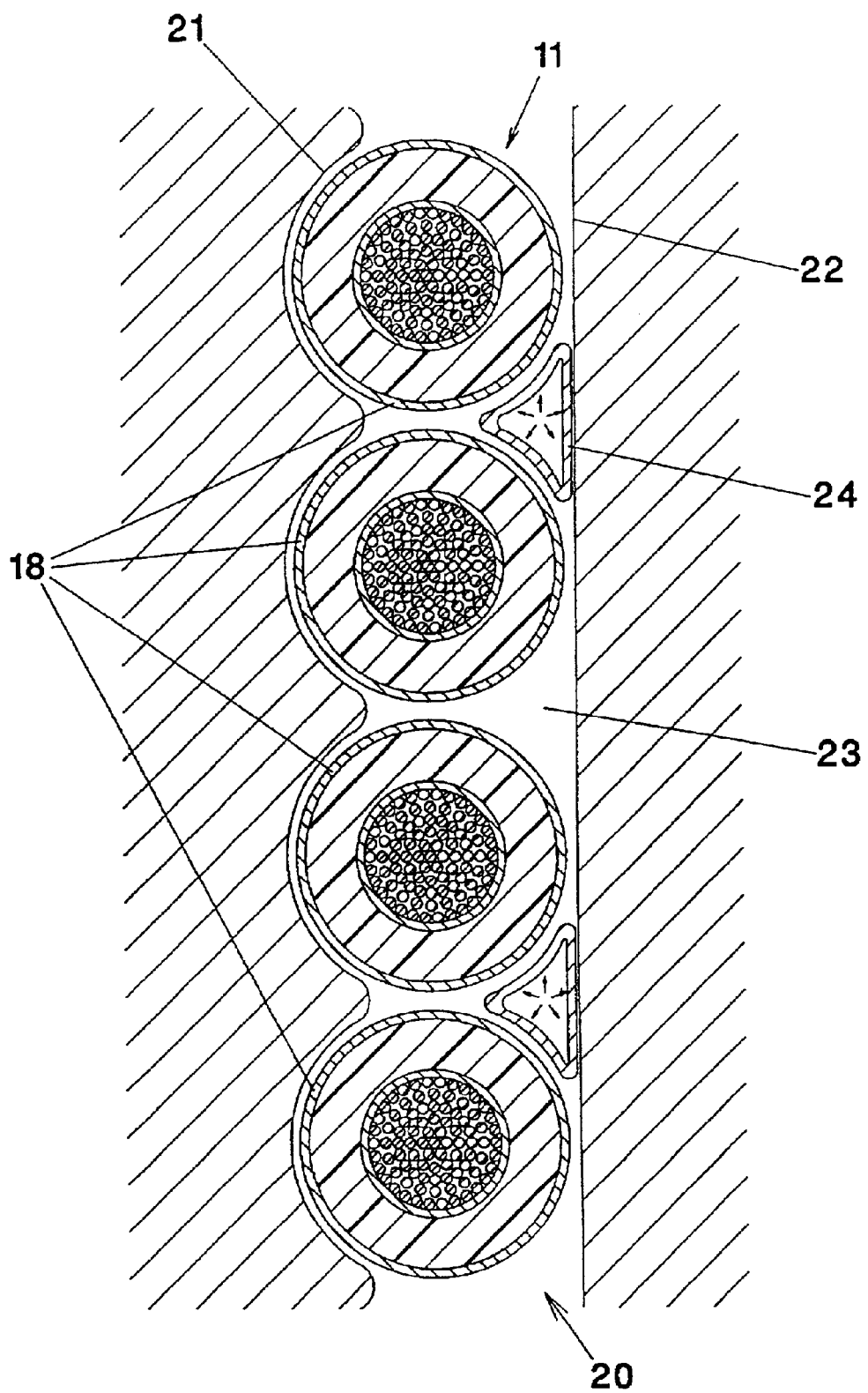
FIG. 4 shows a cross section through part of the sector shown in FIG. 3 where the cross section is marked by a rectangle.

FIG. 1 shows part of an electric machine in which the rotor has been removed to reveal more clearly how a stator 1 is arranged. The main parts of the stator 1 include a stator frame 2, a stator core 3 having stator teeth 4 and a stator yoke 5. The stator also has a stator winding 6 in the form of a high-voltage cable, placed in a space 7 shaped like a bicycle chain, see FIG. 3, formed between each individual stator tooth 4. In FIG. 3 the stator winding 6 is only indicated by its electric conductors. As shown in FIG. 1, the stator winding 6 forms a coil-end bundle 8 on each side of the stator 1. FIG. 3 also reveals that the insulation of the high-voltage cable is stepped in several dimensions depending on its radial location in the stator 1. For the sake of simplicity only one coil-end bundle is shown in FIG. 1 at each end of the stator.

In large conventional machines the stator frame 2 often has a welded steel plate construction. In large machines the stator core 3, also known as the laminated core, is normally made of 0.35 mm core sheet, divided into stacks having an axial length of approximately 50 mm and separated from each other by partitions forming ventilation ducts 5 mm wide. However, in the machine described the ventilation ducts have been eliminated. In large machines each laminated stack is formed by placing sheet metal segments 9, punched to a suitable size, together to form a first layer, each subsequent layer being laid crosswise to form a complete laminated part of a stator core 3. The parts and partitions are held together by pressure brackets 10 which are pressed against pressure rings, fingers or segments, not shown. Only two pressure brackets are shown in FIG. 1.

FIG. 2 illustrates a cross section through a high-voltage cable 11 in accordance with the invention. The high-voltage cable 11 has a number of strand parts 12 made of copper (Cu), for instance, and having circular cross section. These strand parts 12 are arranged in the middle of the high-voltage cable 11. Around the strand parts 12 is a first semiconducting layer 13. Around the first semiconducting layer 13 is an insulating layer 14, e.g. XLPE insulation. Around the insulating layer 14 is a second semiconducting layer 15. The concept "high-voltage cable" in the present application thus does not have the outer protective sheath that normally surrounds a cable for power distribution. The high-voltage cable has a diameter within the interval 20–250 mm and a conducting area within the interval 80–3000 mm$^2$. In the figure showing the component forming the insulated conductor or cable, the three layers are such that they adhere to each other even when the cable is bent. The shown cable is flexible and this property is retained throughout the service life of the cable.

FIG. 3 shows schematically a radial sector of a machine with a sheet metal segment 9 of the stator 1 and a rotor pole 16 on the rotor 17 of the machine. It is also clear that the high-voltage cable 11 is arranged in the space 7 resembling a bicycle chain, formed between each stator tooth 4. Space 7 is shown in the figure in the shape of a bicycle chain, though as shown in FIG. 4, according to one embodiment of the present invention, one side of the slot is entirely flat.

FIG. 4 shows four cable parts 18 of the high-voltage cable 11, which to parts are fitted into an asymmetric stator tooth slot 20 having an undulated side 21 in order to fit against the cable parts and a flat side 22. This shape of the stator tooth slots 20 results in triangular spaces 23 between each cable part 18. In each or in some of these spaces 23, tube members 24 are placed having been preshaped to correspond to the shape of space 23, though of a lesser dimension in order to permit easy insertion into the space 23. The term "tube member" designates in the following both the members function as "cooling tube" as well as fixing the position of the cable.

The tube member 24 is inserted into the space 23 and a pressure medium is heated pressurizing the tube member 24 which will soften and expand, its outer periphery assuming the shape of the restricting area of space 23 delimited by the cable parts second semiconducting layer 15 and the flat side 22 of the stator tooth slot 20, whereafter, maintaining a constant pressure, the warm pressure medium is substituted by a cold pressure medium filling the expanded tube member 24 and causing it to solidify and permanently assuming this expanded shape. It is possible to use the same pressure medium, though at different temperatures. In that case, the temperature of the warm pressure medium will be higher than the softening temperature of the tube member while the temperature of the cold pressure medium will keep below the softening temperature of the tube member. In order to prevent expansion of the free parts of the tube member, i.e. the parts situated outside the stator, these parts are provided with an expansion guard before the pressurization of the cooling tube is started.

Each tube member 24 is made of a dielectric material, e.g. a polymer, preferably XLPE, in order to prevent electric contact with the plate of the stator tooth 4 or with the second semiconducting layer 15 of the cable parts 18.

During expansion the wall thickness of tube member 24 is reduced. The tube member 24 is allowed to expand until 50% of its original wall thickness G remains. The wall thickness and other properties of the tube member are chosen in order to ensure that, after being expanded, the remaining wall thickness is sufficient to completely fill out the space between the outer periphery of the tube member and the second semiconducting layer 15 of the cable parts and the flat side 22 of the stator tooth slot respectively. The material of the tube member is determined with respect to factors like coefficient of thermal conductivity, coefficient of linear expansion as well as hot forming property.

Although the described embodiment relates to a triangular cable interspace, other forms of interspaces are possible, e.g. the cables may be arranged at a larger radial distance thereby forming a hour-glass-shaped interspace in which a pre-shaped cooling tube/fixing means of hour-glass shape may be arranged according to the present invention. It is also possible that the tube member prior to being expanded presents a different cross section than the space itself, e.g. an elliptic cross section, but that the tube member has a wall thickness allowing sufficient expansion.

What is claimed is:

1. A method for mounting a tube in a space in a rotating electric machine defined by a restricting area having a shape corresponding to a shape of the tube comprising the steps of:
    inserting the tube into the space;
    pressurizing the tube with a hot pressure medium having a temperature that causes the tube to soften and expand until an outer periphery of the tube assumes the shape of the restricting area of the space; and
    substituting a cold pressure medium for the hot pressure medium while maintaining a pressure constant to the pressure used in the pressurizing step causing the tube to solidify and permanently assume an expanded shape.

2. The method of claim 1, wherein the tube being at least one of a cooling tube and a spacer between windings in a stator tooth slot.

3. The method of claim 1, wherein the pressurizing step comprises allowing the tube to expand until 50% of an original wall thickness of the tube remains.

4. A rotating electric machine, comprising:
    a stator including a stator yolk and stator slots separated by stator teeth extending inwardly from the stator yolk and having an undulated side and a flat side;
    stator cable windings of an insulated cable having a substantially round cross-section configured to be received into concave portions of the undulated side of the stator slots and form spaces between the insulated cable windings and the flat side of the stator teeth, the spaces extending axially through the stator, said concave portions having a rounded cross-section portion that substantially matches a corresponding outer portion of said insulated cable; and
    at least one tube made of a dielectric material mounted in the stator slots so as to fill the spaces between the insulated cable windings and the flat side of the stator teeth.

5. The rotating electric machine of claim 4, wherein:
the at least one tube being made of a polymer material.

6. The rotating electric machine of claim 4, wherein:
the at least one tube being made of high-density polyethylene.

7. The rotating electric machine of claim 4, wherein:
the at least one tube being made of cross-linked polyethylene.

8. The rotating electric machine of claim 4, wherein:
the spaces are triangular; and
the at least one tube being triangular.

9. The rotating electric machine of claim 4, wherein:
all spaces in the stator slots are filled with the at least one tube.

10. The rotating electric machine of claim 4, wherein:
the insulated cable comprises
    a high-voltage cable that includes
        a conductor having a plurality of strands,
        an inner semiconducting layer disposed around the conductor,
        an insulating layer disposed around the inner semiconducting layer, and
        an outer semiconducting layer disposed around the insulating layer.

11. The rotating electric machine of claim 10, wherein:
the high-voltage cable having a diameter in a range of 20–250 millimeters (mm) and a conducting area in a range of 80–3000 mm$^2$.

12. The rotating electric machine of claim 10, wherein:
the high-voltage cable being flexible.

13. The rotating electric machine of claim 12, wherein:
the layers of the high-voltage cable being configured to adhere to one another when bent.

14. The rotating electric machine of claim 10, wherein:
at least one pair of the inner semiconducting layer and the insulating layer, and the insulating layer and the outer semiconducting layer of the high-voltage cable having a substantially same coefficient of thermal expansion.

15. The rotating electric machine of claim 12, wherein:
the insulating layer comprises a solid material; and,
the respective layers of the high-voltage cable are configured to adhere to each other.

16. The rotating electric machine of claim 10, wherein:
the respective layers of the high-voltage cable comprise materials having an elasticity and coefficients of thermal expansion such that a volume change of the respective layers due to temperature variations being absorbed by the elasticity of the materials and the respective layers remain in contact with each other over an operating temperature range.

17. The rotating electric machine of claim 10, wherein:
the respective layers of the high-voltage cable comprise materials having a high elasticity.

18. The rotating electric machine of claim 10, wherein:
each of the respective layers of the high-voltage cable comprise materials having substantially same coefficients of thermal expansion.

19. The rotating electric machine of claim 10, wherein:
the inner semiconducting layer and the outer semiconducting layer each being configured to constitute a substantially equipotential surface.

20. An apparatus for mounting a tube in a space of a rotating electric machine defined by a restricting area having a shape corresponding to a shape of the tube comprising:

means for inserting the tube into the space;

means for pressurizing the tube with a hot pressure medium having a temperature that causes the tube to soften and expand until an outer periphery of the tube assumes the shape of the restricting area of the space; and means for substituting a cold pressure medium for the hot pressure medium while maintaining a pressure constant to the pressure used in the pressurizing step causing the tube to solidify and permanently assume an expanded shape.

* * * * *